June 6, 1933. M. J. KRAMER 1,912,902
SHAVING MIRROR AND THE LIKE
Filed July 16, 1930 2 Sheets-Sheet 1

INVENTOR.
Max J. Kramer.
BY
ATTORNEY.

June 6, 1933. M. J. KRAMER 1,912,902
SHAVING MIRROR AND THE LIKE
Filed July 16, 1930 2 Sheets-Sheet 2

INVENTOR.
Max J. Kramer.
BY
ATTORNEY

Patented June 6, 1933

1,912,902

UNITED STATES PATENT OFFICE

MAX J. KRAMER, OF NEW YORK, N. Y.

SHAVING MIRROR AND THE LIKE

Application filed July 16, 1930. Serial No. 468,253.

This invention relates to improvements in shaving mirrors and the like having means for electrically illuminating objects to be reflected therein and has for an object the application of such illumination to a mirror in such a manner that only the light passing through an insert in the body of the mirror is utilized.

Another object is to provide an illuminated mirror which may be quickly set and clamped in any desired position.

Still another object is to provide a housing for the illumination, adapted to support a mirror, and which, when the mirror is removed, may be used for other purposes.

Other objects as disclosed in this specification and claimed in the annexed claim will be apparent to those skilled in the art.

Referring to the drawings.

Figure 1:
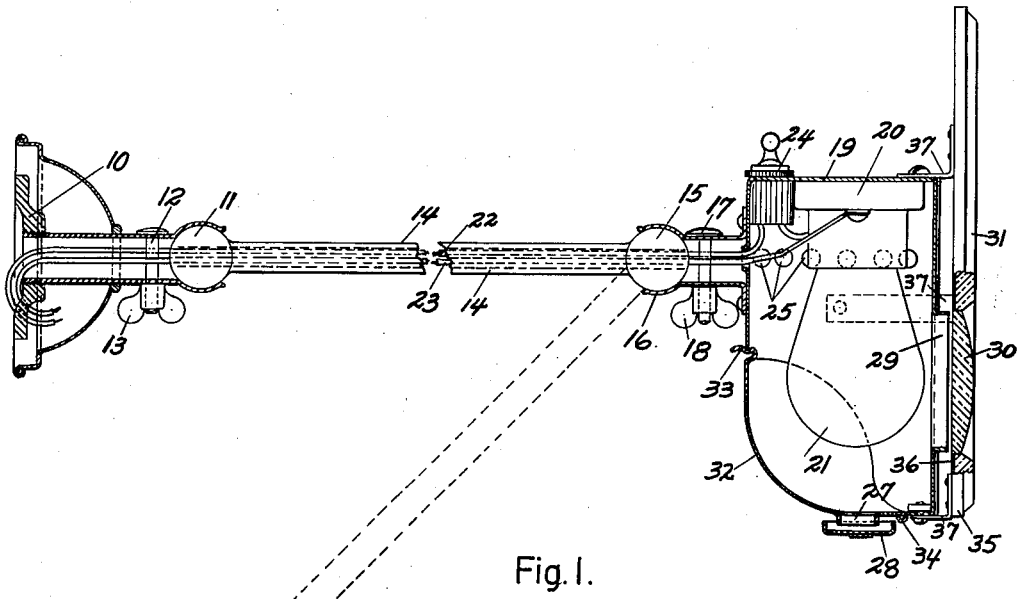
Figure 1 is a side view partly in section and partly in dotted lines showing one embodiment of the invention.

A supporting bracket 10 which may be secured in any suitable manner to a wall or other object has a ball and socket joint 11 which may be clamped in any desired position by means of the bolt 12 and wing-nut 13. The tubular arm 14 has a ball 15 on its other end which cooperates with the socket 16 carried on the lamp housing 19. The bolt 17 and wing-nut 18 are provided so that the ball and socket joint 15, 16 may also be clamped in any desired position.

Within the housing 19 is mounted socket 20 carrying the lamp 21. Insulated wires 22, 23 are provided for connection to a source of current supply and a switch 24 is provided for controlling the light.

Ventilating openings 25 provided near one end have the baffle covers 26 to prevent the leakage of light, and the other end is provided with the ventilating opening 27 and the baffle cover 28.

A tubular extension 29 allows light to pass to the insert 30 in the mirror 31.

A door 32 with a portion forming a latch 33 and hinged at 34 is provided to facilitate changing lamps 21.

The mirror 31 has a metal rim 35 which secures the back 36 thereto, and a plurality of arms 37, secured to the back 36, are provided for supporting the mirror 31 on the lamp housing 19.

With the ball and socket joints it is possible to rotate the mirror through a circular arc and thereby set same so that the insert 30 is at the bottom, top, or any intermediate point, giving maximum illumination to any part of user's face.

Figure 2:
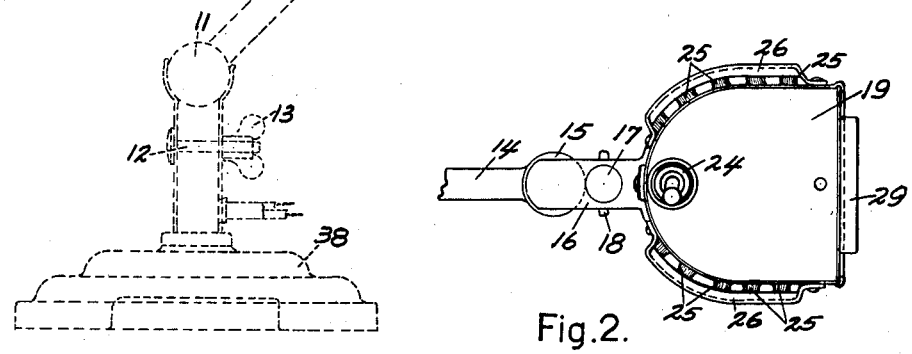
Figure 2 is a top view of the lamp housing with the mirror omitted and the supporting rod broken away.
Figure 3:
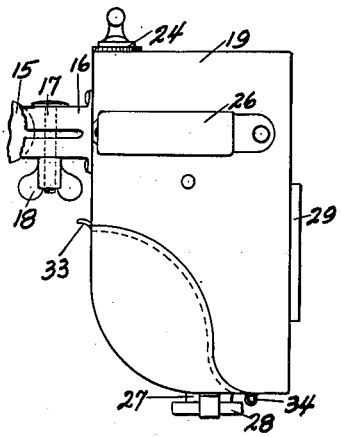
Figure 3 is a side view of the lamp housing.
Figure 4:
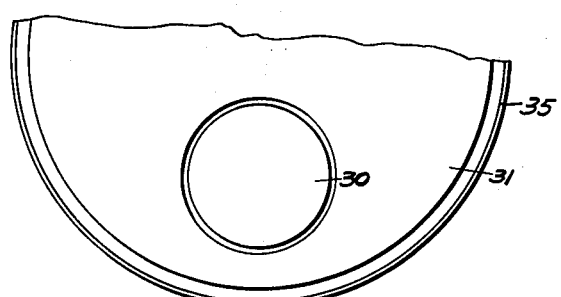
Figure 4 is a front view of the mirror showing the insert.

By substituting a heavy base 38 (shown in dotted lines in Figure 2) for the bracket 10 the device may be made portable, and by removing the mirror 31 it may be used for other purposes.

The insert 30 may be in the form of a lens, a diffusion disc, or it may be omitted to allow light to pass directly through, according to the effect desired.

Figure 5:
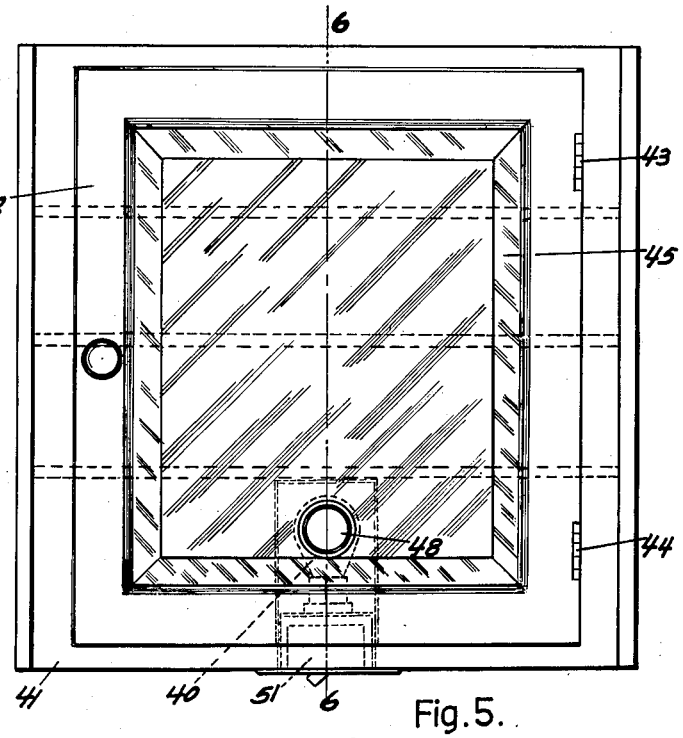
Figure 5 is a front view of a cabinet housing the electrical lamp and the mirror in the door thereof.

In Figure 5 the lamp 40 is housed in a cabinet 41 which may be made of metal or wood and which may be mounted on or in a wall or other support. This cabinet is provided with a door 42 supported on the hinges 43, 44, and containing a mirror 45 which has a hole 46 therethrough with a beveled face 47 adapted to receive an insert 48.

Figure 6:
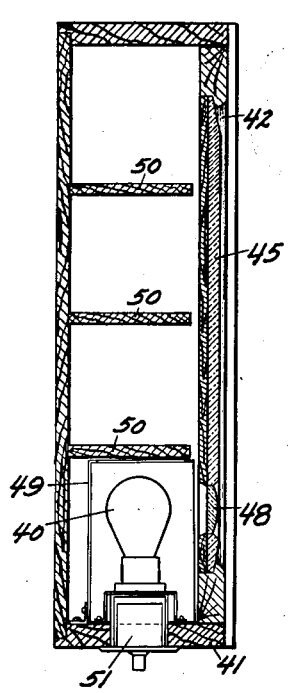
Figure 6 is a sectional view of Figure 5 along the lines 6—6.
Figure 7:
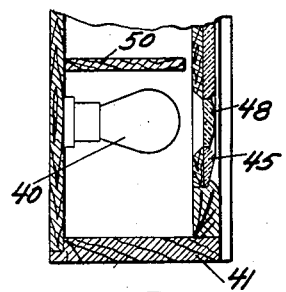
Figure 7 is a sectional view showing another arrangement of the electrical lamp.
Figures 8, 9:
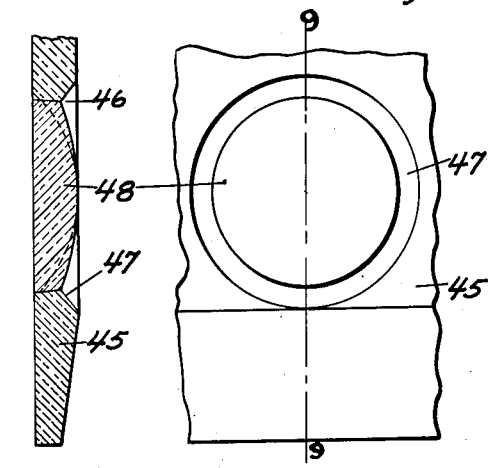
Figure 8 is a fragmentary view showing the insert in the mirror.
Figure 9 is a section along the line 9—9, Figure 8.

A switch 51 may be provided for controlling the light from outside the cabinet, and the light 40 may be mounted upright as shown in Figure 6 or horizontal as shown in Figure 7 and a metal shield 49 may or may not partly surround the same.

One or more shelves 50 may be provided in the cabinet 41 to store articles therein. In Figure 7 the space between the bottom shelf 50 and the bottom of the cabinet 41 may be considered as a housing for the lamp 40.

I claim:

In a device of the character described, a storage cabinet having shelves therein dividing the interior thereof into a plurality of compartments, a door forming a closure for said cabinet and communicating with all of said compartments, a mirror forming part of said door, a lamp positioned in one of said compartments, an aperture in said mirror communicating with the compartment containing said lamp, a condensing lens mounted in said aperture and adapted to gather light from said lamp and diffuse the same over the surface of an object facing said mirror, and a switch positioned in the bottom of said cabinet for controlling the operation of said lamp, said compartments adapted for the storage of articles and said door being so arranged that when the same is opened said lamp and said articles are accessible, substantially as described.

In testimony whereof I affix my signature.

MAX J. KRAMER.